3,055,081
METHOD OF MAKING A PIEZO-ELECTRIC DEVICE

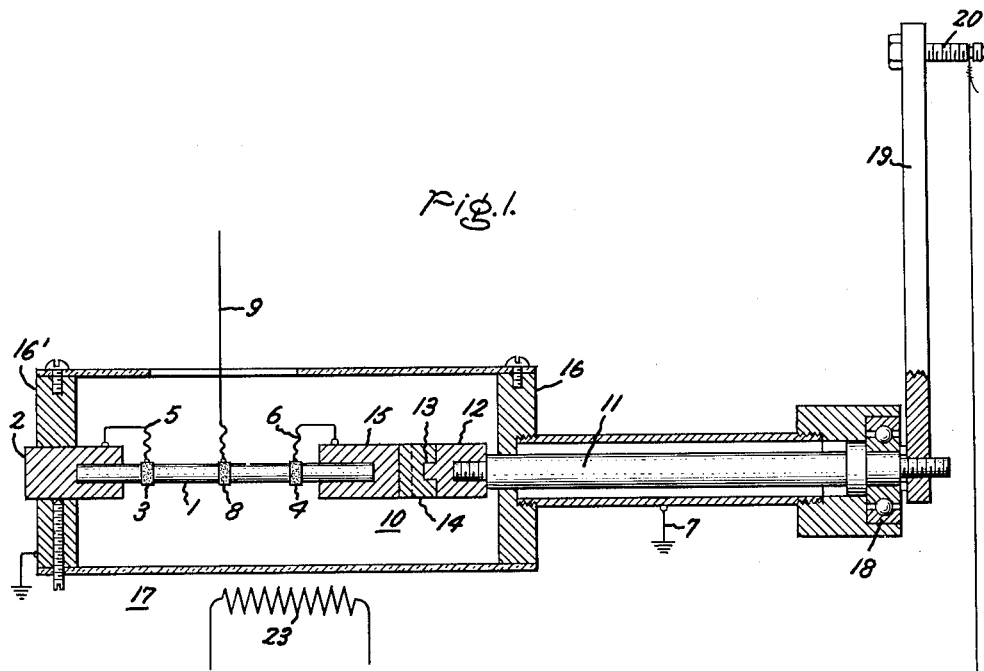

Shepard Roberts, Scotia, N.Y., assignor to General Electric Company, a corporation of New York
Original application Oct. 30, 1952, Ser. No. 317,612, now Patent No. 2,902,545, dated Sept. 1, 1959. Divided and this application May 8, 1959, Ser. No. 811,900
5 Claims. (Cl. 29—25.35)

The present invention relates to electromechanical transducers and comprises both improved piezo-electric devices and an improved method of producing such devices. This application is a division of my copending application Serial Number 317,612, filed October 30, 1952, and assigned to the assignee of the present invention.

It is known that various ceramic materials, and in particular the titanates of some alkaline earth metals may be given piezo-electric properties either by the sole action of a strong polarizing electric field or by the conjoint action of mechanical deformation and the polarizing electric field.

Some applications of electromechanical translation devices require that the device shall respond piezo-electrically with a high ratio of electrical voltage to the applied mechanical deforming force. It has been suggested that a plate or slab of piezo-sensitive ceramic material shall be mounted between conductors applied to the opposite flat surfaces of the plate and that piezo-electric properties should be imparted by applying to the plate a transverse force during polarization by an electric field.

The voltage produced by polarization of such a plate held between oppositely disposed electrodes necessarily would be restricted by the structural limitations of such a unit. The voltage in a piezo-electric unit depends on the electric field set up by stress in the material. In the suggested device the distance between the opposite sides of a plate to which the electrodes are applied is the shortest dimension of the unit. The voltage of a unit having such configuration cannot be increased by merely increasing the thickness of the plate and thus increasing the distance between the electrodes as this would cause the force applied during polarization to be distributed in such a way that the unit stress in the material would be disadvantageously scattered with a corresponding reduction of electric field. Hence, the voltage produced by such unit necessarily must be low.

In accordance with my present invention, improved piezo-electric transducers of higher voltage output have been provided by polarizing elongated units, and preferably units of cylindrical or tubular configuration, in an electric field while applying torsional or twisting stresses in the material in the direction of the major axis. A feature of my invention also comprises the spatial relation of the electrodes on the elongated unit. The electrodes are applied at regions axially spaced apart and preferably the electrodes embrace circumferentially the end regions of cylindrical units and preferably tubular units.

FIG. 1 of the accompanying drawing shows an elongated ceramic unit being submitted to polarization at an elevated temperature while applying torsional forces; and FIG. 2 shows a tubular piezo-electric element mounted on a tone arm of a phonograph.

Referring to the drawing, an elongated ceramic unit 1 is shown as fixedly attached to a stationary base 2. The unit 1 may consist of particles of a titanate of an alkaline earth metal. Particles of titanate may be bonded to one another by sintering the particles at an elevated temperature. They may be bonded with a suitable mineral material, as for example finely divided $TiO_2$, or with other suitable bonding material. Although my invention is not restricted to any specific material or class of piezo-electric materials, a preferable material is barium titanate.

Electrodes 3, 4 mounted on the unit 1 of FIG. 1 (a tube or a rod) at regions spaced apart are connected to conductors 5, 6 which are connected in turns to parts of the apparatus, the latter being grounded as indicated at 7. Such electrodes may consist of encircling bands of silver, copper or other metal, which may be applied as a paste of the chosen metal in a finely divided state. The central electrode 3 is connected to a conductor 9 whereby during operation a polarizing potential may be applied from a suitable source (not shown).

The piezo-electric unit 1 at its end opposite the fixed support 2, is linked to a holder 10 which in turn is connected to a rotatable shaft 11. The holder 10 consists of several separable parts. The part 12 is screwed, as indicated, to the shaft 11. A protuberant tip 13 thereof engages with a slot in the link 14 which in turn engages with a slot in the part 15 which grasps the end of the ceramic unit 1. The end of the shaft 11 which is connected to the holder 10 is supported on a bearing within an orifice of the end wall 16 of a housing 17 surrounding the ceramic unit 1. The base 2 is supported by the opposite end wall 16' of the housing 17. The outer extremity of the shaft 11 is supported in a bearing 18 and has attached thereto a lever 19. At the end of the lever 19 is affixed a post 20 to which may be applied a weight 21 by a wire or cord 22. The weight of the lever 19 itself and the added weight 21 attached thereto when the lever is in a horizontal position causes a twisting force to be applied to the ceramic unit 1 without any bending force as the unit to be polarized is supported at both ends. The lever 19 is shown in an upright position, as in this position it is more readily illustrated. However, it is assumed to be oriented horizontally when twisting force is applied to the unit 1.

During polarization, the unit 1 perferably is suitably heated, an external electric heater being indicated at 23. If the unit is heated during polarization to above the Curie temperature, which for barium titanate approximates 120° C., the intensity of electric field which is required for polarizing the ceramic material need not be so high as in the absence of heating. The polarizing field must be continued, however, until the temperature again has been reduced below the Curie temperature.

If a temperature above the Curie point is chosen, a polarizing field of 2.5 kilovolts or higher per centimeter should be applied to the material by connection of a unidirectional source of chosen potential to the conductor 9, the return path being the conductors 5, 6. The time required for the unit 1 to cool through the Curie point is sufficient to achieve permanent piezo-electric effect. If polarization is carried out at room temperature, a stronger polarizing field is desirable. The application of a weak electric field such as 2.5 kilovolts per centimeter should be continued for several hours; but if the applied field is as high as 25 kilovolts per centimeter, polarization will be substantially instantaneous.

During the application of the electric field, a mechanical twisting force is applied at the free end of the unit by the rotation of lever arm 19, which force produces a shear stress in the material. The electric field, which is parallel to the axis between the electrodes, induces a polarization which is modified by the mechanical stress so as to be inclined at an angle to this axis. Neither the electric field nor the twisting force is removed until the temperature again has been reduced substantially below the Curie temperature or the polarization has been completed at room temperature. Upon release of the twisting force and removal of the applied potential, the polarized unit is piezo-electrically sensitive to torsion, making such a unit useful for various purposes. One field of use is the measurement of varying torque in machinery.

As illustrated in FIG. 2, a twist-polarized unit 1 (here being shown as a tube) is attached to the tone arm 25 of a phonograph which is provided at its free end with a stylus 26. The bearing 27 at the tip of the stylus engages with the sound groove of phonograph record 28. The stylus 26 should extend essentially tangent to the grooves in the record to the radius of the phonograph plate 28.

As the record is revolved by the motor 29, a variable twisting force is applied to the polarized piezo-electric unit 1 by the stylus 26 bearing against the variable sound track on the record 28. The resulting voltages are impressed upon appropriate electric amplifying apparatus (not shown) whereby the recorded sound is reproduced. For this purpose, the end electrodes 3, 4 may be connected to ground by the conductors 31 and 32. The central electrode 8 is connected by a conductor 34 to suitable sound amplifying and recording equipment (not shown).

Intermediate electrode 8 may be omitted and polarization accomplished by applying the designated potentials between electrodes 3 and 4 while unit 1 is under the above described torsional stress. In this case the sound reproducing equipment is connected to receive the piezo-electric voltage developed between electrodes 3 and 4, only one of which may be grounded. It will be appreciated, however, that the use of an additional central electrode 8 as described above has the advantages of permitting the grounding of both supporting structures 2 and 10 of FIG. 1; of reducing the polarizing potentials which need be applied to electrodes 3 and 4 for the distance between them; and of producing oppositely-directed polarization in the portions of unit 1 on either side of the central electrode 8 with the result that a symmetrical push-pull piezo-electric voltage is generated producing greater electrical charge between electrode 8 and the grounded electrodes 3 and 4 when the polarized unit 1 is subject to torsion.

The following results were obtained with a barium titanate tube which was 4 inches long, having an outside diameter of 5.2 millimeters, the inside diameter being one-half of this dimension. Three conducting silver bands were applied, spaced one inch apart. The central band was connected to a D.C. potential of about 6,000 volts, the outer bands being grounded. A weight of 500 grams was applied to a handle (such as 19 when horizontal) and having a length of 10 cm., to produce a twisting torque. The tube was heated to 125° C., with the polarizing being applied and then was cooled to 60° C., the polarizing voltage and torque being continuously applied. At 60° C. the voltage and torque were removed. The tube finally was cooled to room temperature.

The tube so treated exhibits high piezo-electric voltages when twisted. The charge generated by applying to such a unit a twisting force set up by a 500 gram weight at the end of the rod 19 at a radius of 10 cm. was 25,000 microcoulombs.

This figure corresponds to a piezo-electric shear modulus about equal to the best values obtained for transverse piezo-electric modulus in barium titanate polarized by methods heretofore employed. The improved transducer made as herein described takes advantage of the improved geometrical disposition of the electrodes and provides an improved method of activation. One of the advantages is a higher voltage for a given distorting force by reason of the greater distance between the electrodes.

What I claim as new and desire to secure by Letters Patent of the United States is:

1. The method of activating an elongated body of piezo-electric sensitizable ceramic material which comprises supporting said body against bending deformation transverse to the longitudinal axis of said body, while so supported applying to said body forces which subject said body to rotative mechanical forces productive of twisting deformation about a longitudinal axis and during the application of said forces applying to said body a polarizing electric field in a direction substantially parallel to said axis, the application of said forces and said field being effective to produce a polarization which is at an angle to the longitudinal axis of said body and being continued for a time of sufficient length to produce continued piezo-electric sensitivity to twist after the removal of said polarizing field and removing both said mechanical force and said field when a desired state of activation has been attained.

2. The method of activating an elongaed body of electromechanically sensitizable ceramic material which comprises applying to said body a unidirectional polarizing electric field in a direction substantially parallel to the longitudinal axis of said body, supporting said body at opposite ends to avoid substantial bending deformation transverse to said longitudinal axis, holding one end of said body anchored to resist rotation and applying to the opposite end during the application of said field a rotative force whereby said body is subjected to twisting deformation, the application of said field and twisting force being effective to produce a polarization which is at an angle to the longitudinal axis of said body and being continued for a period of time long enough to render said body capable of developing piezo-electric voltage response to twisting forces.

3. The method of activating an elongated tubular body of barium titanate which comprises heating said body to a temperature above the Curie point, applying parallel to the axis of said body while heating a polarizing field of at least about 2.5 kilovolts per centimeter, simultaneously applying lengthwise of said body a mechanical twisting force to produce a polarization in said body which is at an angle to the longitudinal axis thereof, and cooling said body below said Curie point while the polarizing field and mechanical force are maintained.

4. The method of activating an elongated tubular body of barium titanate which comprises subjecting said body to rotative force acting to twist said body about a longitudinal axis to produce a shear stress therein and during the application of such force, applying an electric polarizing field to said body to produce a polarization therein which is at an angle to the longitudinal axis of said body.

5. The method of activating an elongated body of piezo-electric sensitizable ceramic material which consists in applying to said body a unidirectional polarizing field in a direction substantially parallel to a longitudinal axis of said body at a temperature above the Curie temperature, supporting said body against bending deformation, subjecting said body to mechanical forces tending to twist said body, said unidirectional field and mechanical twisting force producing a polarization in said body which is at an angle to the longitudinal axis thereof, upon the development of desired piezo-electric properties in said body, cooling to room temperature and finally removing both mechanical and electrical activation forces.

References Cited in the file of this patent
UNITED STATES PATENTS

| | | |
|---|---|---|
| 2,486,560 | Gray | Nov. 1, 1949 |
| 2,497,108 | Williams | Feb. 14, 1950 |
| 2,624,853 | Page | Jan. 6, 1953 |